United States Patent
Ishida et al.

(10) Patent No.: US 10,919,648 B2
(45) Date of Patent: Feb. 16, 2021

(54) METHOD FOR MANUFACTURING COMPONENT AND COMPONENT MANUFACTURING SYSTEM

(71) Applicant: MITSUBISHI HEAVY INDUSTRIES, LTD., Tokyo (JP)

(72) Inventors: Makoto Ishida, Tokyo (JP); Yuji Ito, Tokyo (JP); Kyosuke Mine, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/349,049

(22) PCT Filed: Oct. 18, 2017

(86) PCT No.: PCT/JP2017/037684
§ 371 (c)(1),
(2) Date: May 10, 2019

(87) PCT Pub. No.: WO2018/088149
PCT Pub. Date: May 17, 2018

(65) Prior Publication Data
US 2019/0283902 A1    Sep. 19, 2019

(30) Foreign Application Priority Data

Nov. 11, 2016  (JP) .................................. 2016-220430

(51) Int. Cl.
*B64F 5/10*       (2017.01)
*B25J 9/16*       (2006.01)
(Continued)

(52) U.S. Cl.
CPC ............... *B64F 5/10* (2017.01); *B25J 9/1697* (2013.01); *B25J 11/005* (2013.01); *B25J 13/08* (2013.01);
(Continued)

(58) Field of Classification Search
CPC .......... B64F 5/10; B25J 9/1697; B25J 11/005; G05B 2219/32285; G05B 2219/39001
See application file for complete search history.

(56) References Cited

U.S. PATENT DOCUMENTS 4,967,947 A  *  11/1990  Sarh ........................ B21J 15/14
                                                    227/156
5,560,102 A  *  10/1996  Micale .................... B23P 21/00
                                                    29/407.1

(Continued)

FOREIGN PATENT DOCUMENTS

| JP | H09-319420 A | 12/1997 |
| JP | 2004-261881 A | 9/2004 |
| JP | 2010-231575 A | 10/2010 |

OTHER PUBLICATIONS

International Search Report in corresponding International Application No. PCT/JP2017/037684, dated Jan. 23, 2018 (5 pages).

(Continued)

*Primary Examiner* — Vincent H Tran
(74) *Attorney, Agent, or Firm* — Osha Bergman Watanabe & Burton LLP

(57) ABSTRACT

To facilitate mounting of a second member on a first member having a plate shape while the first member is supported in a state of being deformable due to gravity. A method for manufacturing a component includes: a step (S13) where a supporting robot supports a skin having a plate shape in a state where the skin is deformable due to gravity, and a support state of the skin is changed based on teaching data based on a deformed shape of the skin, which is recorded in advance in a storage unit and which is obtained at the time of mounting a frame on the skin; and a step (S15) where a mounting robot makes the frame overlap with the skin where a support state is changed.

4 Claims, 7 Drawing Sheets

(51) Int. Cl.
  *B25J 11/00*    (2006.01)
  *B64C 1/06*    (2006.01)
  *B64C 1/12*    (2006.01)
  *B25J 13/08*   (2006.01)

(52) U.S. Cl.
  CPC .................. *B64C 1/06* (2013.01); *B64C 1/12* (2013.01); *G05B 2219/32285* (2013.01); *G05B 2219/39001* (2013.01)

(56) References Cited

U.S. PATENT DOCUMENTS

| | | |
|---|---|---|
| 5,615,483 A | 4/1997 | Micale et al. |
| 5,896,637 A * | 4/1999 | Sarh ................ B23P 19/04 227/51 |
| 6,029,352 A * | 2/2000 | Nelson ............. B23P 19/04 29/429 |
| 6,141,848 A * | 11/2000 | Yousko ............ B21J 15/10 227/111 |
| 2001/0024603 A1 | 9/2001 | Stone et al. |
| 2013/0185925 A1 * | 7/2013 | Sarh ................ B21J 15/30 29/559 |
| 2015/0083860 A1 * | 3/2015 | Frauen ............. B64F 5/10 244/119 |
| 2016/0288331 A1 | 10/2016 | Sivich et al. |
| 2017/0066143 A1 * | 3/2017 | Hantzschel ....... B29C 66/9121 |

OTHER PUBLICATIONS

Written Opinion in corresponding International Application No. PCT/JP2017/037684, dated Jan. 23, 2018 (3 pages).

\* cited by examiner

METHOD FOR MANUFACTURING COMPONENT AND COMPONENT MANUFACTURING SYSTEM

TECHNICAL FIELD

The present invention relates to a method for manufacturing a component and a component manufacturing system. The present invention particularly relates to a method for manufacturing a component and a component manufacturing system which manufacture an aircraft component produced by combining a skin, which is a plate-shaped member, and a frame or a stringer, which is an elongated member, with each other.

BACKGROUND ART

An aircraft component, such as a fuselage, is produced such that a stringer or a frame is fastened to a plate-shaped member (skin) with a rivet, thus forming an integral body, for example. Conventionally, these members are assembled such that, in a state where a skin is fixed to a stand-shaped jig, a frame or a stringer, which is positioned by another positioning jig, is made to overlap with the skin and, thereafter, the frame or stringer is temporarily fastened to the skin with temporary rivets. Then, after the temporary fastening is completed and an inspection is finished, riveting is performed at rivet fastening positions which are determined in advance. With such operations, an aircraft component where the skin, the frame and the stringer are formed into an integral body is produced.

The fuselage of an aircraft has a circular shape in cross section, and the diameter of the circular shape varies along the axial direction of the aircraft and hence, various kinds of skins, frames, and stringers are used. Accordingly, it is also necessary to prepare many kinds of stand-shaped jigs for fixing a skin and many kinds of positioning jigs for a frame or a stringer in advance. For this reason, as a method for producing an aircraft component using jigs, there is a method where members, such as a skin, a frame, and a stringer, are positioned using robots, and riveting is performed on the respective members which are positioned by the robots, thus forming an integral body. With the use of such a method, aircraft components can be produced without preparing various kinds of jigs, thus reducing storage space for jigs and labor required for exchanging jigs, while reducing time and costs required for production preparation of aircraft components.

PTL 1 described below discloses a technique where components are assembled in a state where a skin is placed on a fixture (Fixture 34).

CITATION LIST

Patent Literature

[PTL 1] U.S. Pat. No. 5,615,483

SUMMARY OF INVENTION

Technical Problem

Inventors of the present invention have conducted studies on a method for supporting a skin, which is a plate-shaped member, for a method for assembling aircraft components such that members, such as a skin, a frame, and a stringer, are made to overlap each other using the above-mentioned robots. The plate-shaped member has low rigidity, thus being easily deformed under the influence of gravity. Accordingly, conventionally, in combining members with each other, a skin is generally fixed to a stand-shaped jig having high rigidity.

With respect to a method for supporting a plate-shaped member in assembling aircraft components, the inventors focused on a technique where components are assembled while the plate-shaped member is supported by making use of the fact that the plate-shaped member has low rigidity, and is deformed under the influence of gravity.

The present invention has been made under such circumstance, and it is an object of the present invention to provide a method for manufacturing a component and a component manufacturing system which can facilitate mounting of a second member on a first member having a plate shape while the first member is supported in a state of being deformable due to gravity.

Solution to Problem

A method for manufacturing a component according to a first aspect of the present invention includes: a first step where a supporting robot supports a first member having a plate shape in a state where the first member is deformable due to gravity; a second step where a support state of the first member is changed based on a deformed shape of the first member, which is recorded in advance in a storage unit and which is obtained at the time of mounting a second member on the first member; and a third step where a mounting robot mounts the second member on the first member where the support state is changed.

With such a configuration, the supporting robot supports the first member having a plate shape in a state where the first member is deformable due to gravity, and the support state of the first member is changed based on the deformed shape of the first member, which is recorded in advance in the storage unit and which is obtained at the time of mounting the second member on the first member. Then, the mounting robot mounts the second member on the first member where the support state is changed. At this point of operation, the first member assumes a deformed shape obtained at the time of mounting the second member on the first member and hence, mounting of the second member on the first member is facilitated.

In the above-mentioned first aspect, the method may further include, before the second step, a fourth step of recording, in the storage unit, the deformed shape of the first member in a state of being supported, the deformed shape being obtained at the time of mounting the second member on the first member, and recording the support state of the first member which is brought about by the supporting robot and, in the second step, a support state of the first member may be changed such that the first member assumes the support state which is recorded in the storage unit, which is obtained at the time of mounting the second member on the first member, and which is brought about by the supporting robot.

With such a configuration, the storage unit records the deformed shape of the first member in a state of being supported, the deformed shape being obtained at the time of mounting the second member on the first member, and the support state of the first member which is brought about by the supporting robot. Further, the support state of the first member is changed based on the deformed shape of the first member, which is recorded in advance in the storage unit and which is obtained at the time of mounting the second member on the first member, and the support state of the first member which is brought about by the supporting robot. That is, the support state of the first member is changed to a support state which is obtained at the time of mounting the second member on the first member so that the first member assumes a deformed shape which is obtained at the time of mounting the second member on the first member. As a result, mounting of the second member on the first member is facilitated.

In the above-mentioned first aspect, the second step may include: a step where a detection robot detects a shape of the first member; and a step where after a comparison is performed between the shape of the first member which is detected and the deformed shape of the first member, which is recorded in advance in the storage unit and which is obtained at the time of mounting the second member on the first member, a support state of the first member is changed.

With such a configuration, the shape of the first member is detected and, then, the support state of the first member is changed after a comparison is performed between the shape of the first member which is detected and the deformed shape of the first member, which is recorded in advance in the storage unit and which is obtained at the time of mounting the second member on the first member. The support state of the first member is changed based on the comparison result so as to cause the first member to assume the support state which is obtained at the time of mounting the second member on the first member. With such operations, the first member assumes the deformed shape which is obtained at the time of mounting the second member on the first member. As a result, mounting of the second member on the first member is facilitated.

A component manufacturing system according to a second aspect of the present invention includes: a supporting robot configured to support a first member having a plate shape in a state where the first member is deformable due to gravity; and a mounting robot configured to mount a second member on the first member, wherein the supporting robot includes a first control unit which drives the supporting robot so as to change a support state of the first member based on a deformed shape of the first member, which is recorded in advance in a storage unit, and which is obtained at the time of mounting the second member on the first member, and the mounting robot includes a second control unit which drives the mounting robot so as to mount the second member on the first member where the support state is changed.

In the above-mentioned second aspect, the supporting robot may further include the storage unit which records the deformed shape of the first member in a state of being supported, the deformed shape being obtained at the time of mounting the second member on the first member, and a support state of the first member which is brought about by the supporting robot, and the first control unit of the supporting robot may drive the supporting robot to change the support state of the first member such that the first member assumes a support state which is recorded in the storage unit, which is obtained at the time of mounting the second member on the first member, and which is brought about by the supporting robot.

In the above-mentioned second aspect, the component manufacturing system may further include a detection robot configured to detect a shape of the first member, and the first control unit of the supporting robot may perform a comparison between the shape of the first member which is detected and the deformed shape of the first member, which is recorded in advance in the storage unit and which is obtained at the time of mounting the second member on the first member, and the first control unit of the supporting robot may drive the supporting robot to change the support state of the first member.

Advantageous Effects of Invention

According to the present invention, the first member having a plate shape is supported in a state where the first member is deformable due to gravity, and the support state of the first member is changed such that the first member assumes a deformed shape which is obtained at the time of mounting the second member on the first member. Accordingly, it is possible to facilitate mounting of the second member on the first member.

DESCRIPTION OF EMBODIMENTS

Hereinafter, embodiments according to the present invention are described with reference to drawings.

First Embodiment

An aircraft component manufacturing system 1 according to a first embodiment of the present invention changes the attitude of a member, that is, the support state of the member, thus varying the shape of the member so as to make the member always advantageous for assembly at the time of assembling the member. In this embodiment, the aircraft component refers to as a fuselage, a main wing or the like of an aircraft, for example. Hereinafter, the description is made with respect to a case where a skin, which is a plate-shaped member, and a frame or a stringer, each of which is an elongated member, are combined with each other in manufacturing a fuselage of an aircraft. In assembling the member, when it is preferable that a skin be in an open state, for example, supporting robots support the skin in a support state where the chord side of the skin is disposed above the arc side of the skin. On the other hand, in assembling the member, when it is preferable that a skin be in a closed state, for example, the supporting robots support the skin in a support state where the chord side of the skin is disposed below the arc side of the skin.

The skin has an arc shape in cross section taken perpendicular to the axial direction of an aircraft. The frame is a member which is disposed along the circumference of the skin. The frame has an arc shape, and has a curvature. The stringer is a member which is disposed on the skin parallel to the axial direction of the aircraft, and the stringer is a linear member. The frame or the stringer is mounted on the skin to produce an aircraft component, such as a fuselage. In producing the aircraft component, positioning for mounting the frame or the stringer on the skin can be performed based on keyholes formed in the skin and keyholes formed in the frame or the stringer. Further, by inserting temporary rivets into the keyholes formed in the skin and the keyholes formed in the frame or the stringer and fastening these members together, it is possible to form the skin and the frame or the stringer into an integral body. The keyhole refers to a through hole formed in a member in a penetrating manner. The keyhole may be used for performing positioning at the time of mounting the member. Further, the keyhole allows the insertion of a temporary rivet.

Figure 1:
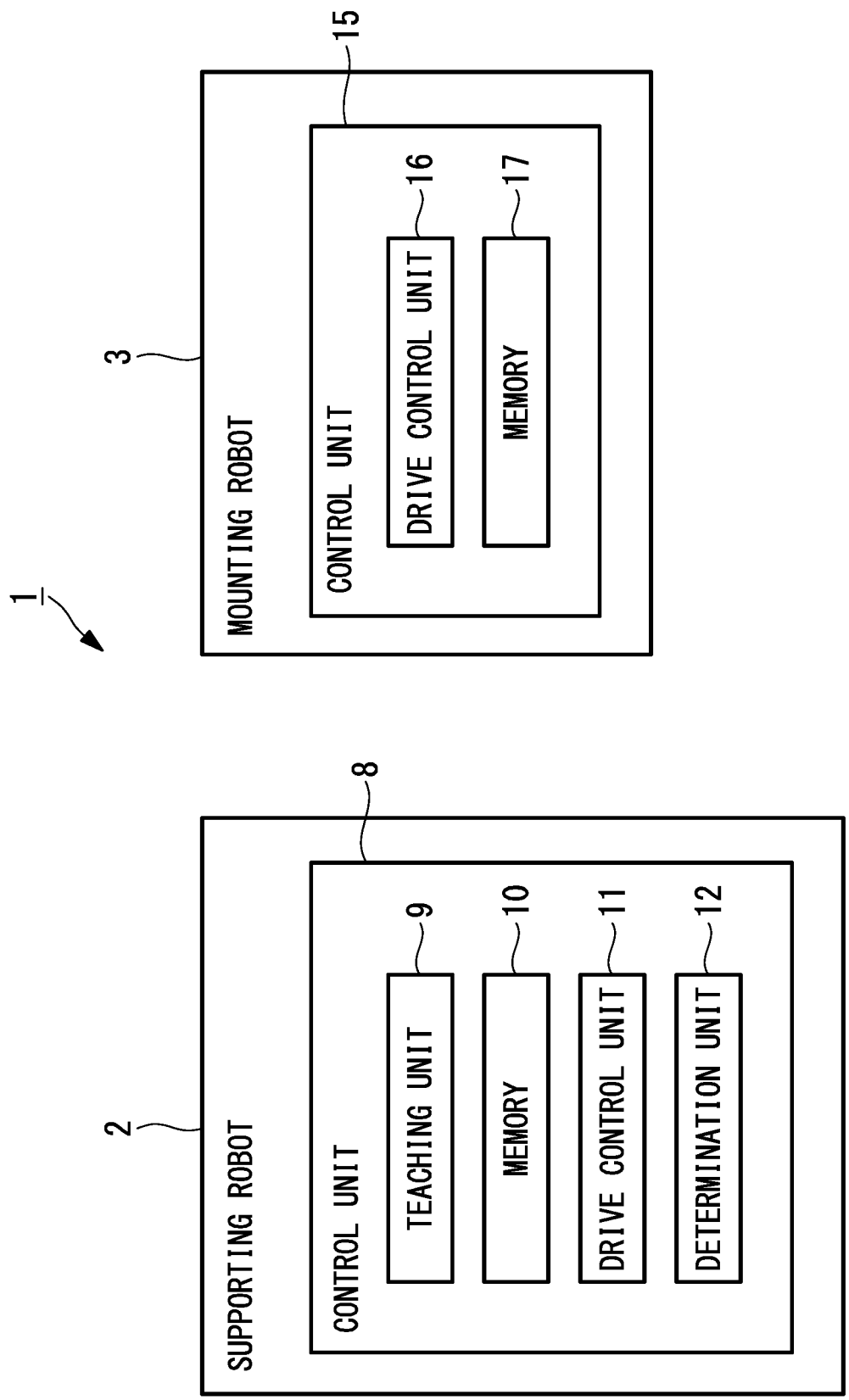
FIG. 1 is a block diagram showing an aircraft component manufacturing system according to a first embodiment of the present invention.
Figure 2:
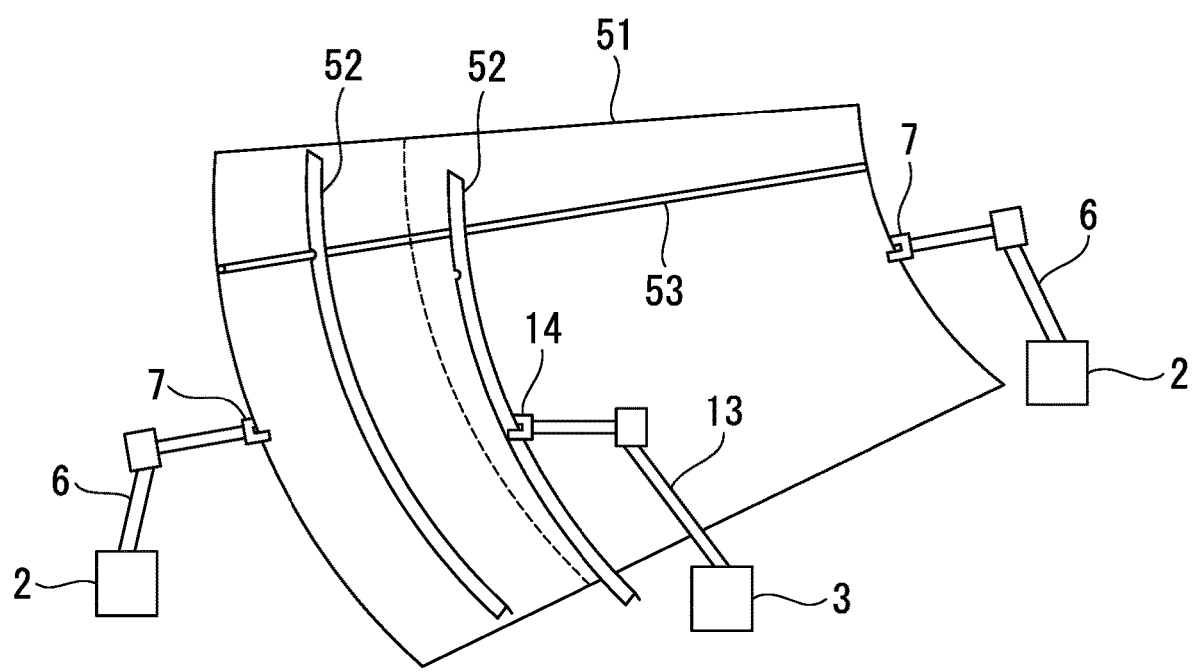
FIG. 2 is a schematic view showing supporting robots, a mounting robot, a skin, frames, and a stringer according to the first embodiment of the present invention.

As shown in FIG. 1 and FIG. 2, the aircraft component manufacturing system 1 according to this embodiment includes two supporting robots 2 which support a skin 51, a mounting robot 3 which mounts a frame 52 or a stringer 53 on the skin 51 and the like. In this embodiment, the supporting robots 2 are operated using teaching data to change the direction of the skin 51.

Each supporting robot 2 includes an arm 6. A gripping unit (hand) 7 is mounted on the distal end of the arm 6, and the gripping unit 7 grips the skin 51. The supporting robot 2 supports the skin 51 by gripping the center portion of an arc-shaped end portion of the skin 51, for example. The supporting robot 2 is controlled by a control unit 8.

As shown in FIG. 1, the control unit 8 of the supporting robot 2 includes a teaching unit 9, a memory 10, a drive control unit 11, a determination unit 12 and the like. The operation of the control unit 8 is achieved by hardware resources, such as a CPU, with execution of a program recorded in advance.

The teaching unit 9 records, in a teaching step, the state of the supporting robot 2, such as the position and the direction of the arm 6 or the hand 7, an operation process and the like, in the memory 10 as teaching data. Further, the drive control unit 11 causes, in a mounting step, the supporting robot 2 to operate based on the teaching data recorded in the memory 10. At this point of operation, the determination unit 12 determines whether or not the state of the supporting robot 2 in the mounting step agrees with the teaching data. When the determination unit 12 determines that the state of the supporting robot agrees with the teaching data, the drive control unit 11 maintains the state of the supporting robot 2.

The mounting robot 3 includes an arm 13. A gripping unit (hand) 14 is mounted on the distal end of the arm 13, and the gripping unit 14 grips the frame 52 or the stringer 53. The mounting robot 3 is controlled by a control unit 15. The operation of the control unit 15 is achieved by hardware resources, such as a CPU, with execution of a program recorded in advance.

The control unit 15 of the mounting robot 3 includes a drive control unit 16, a memory 17 and the like.

Based on data relating to a mounting position which is recorded in advance in the memory 17, the drive control unit 16 drives the arm 13 of the mounting robot 3 to move the frame 52 or the stringer 53 to the mounting position recorded in advance. As a result, the frame 52 or the stringer 53 is made to overlap with the skin 51 by the mounting robot 3.

Figure 3:
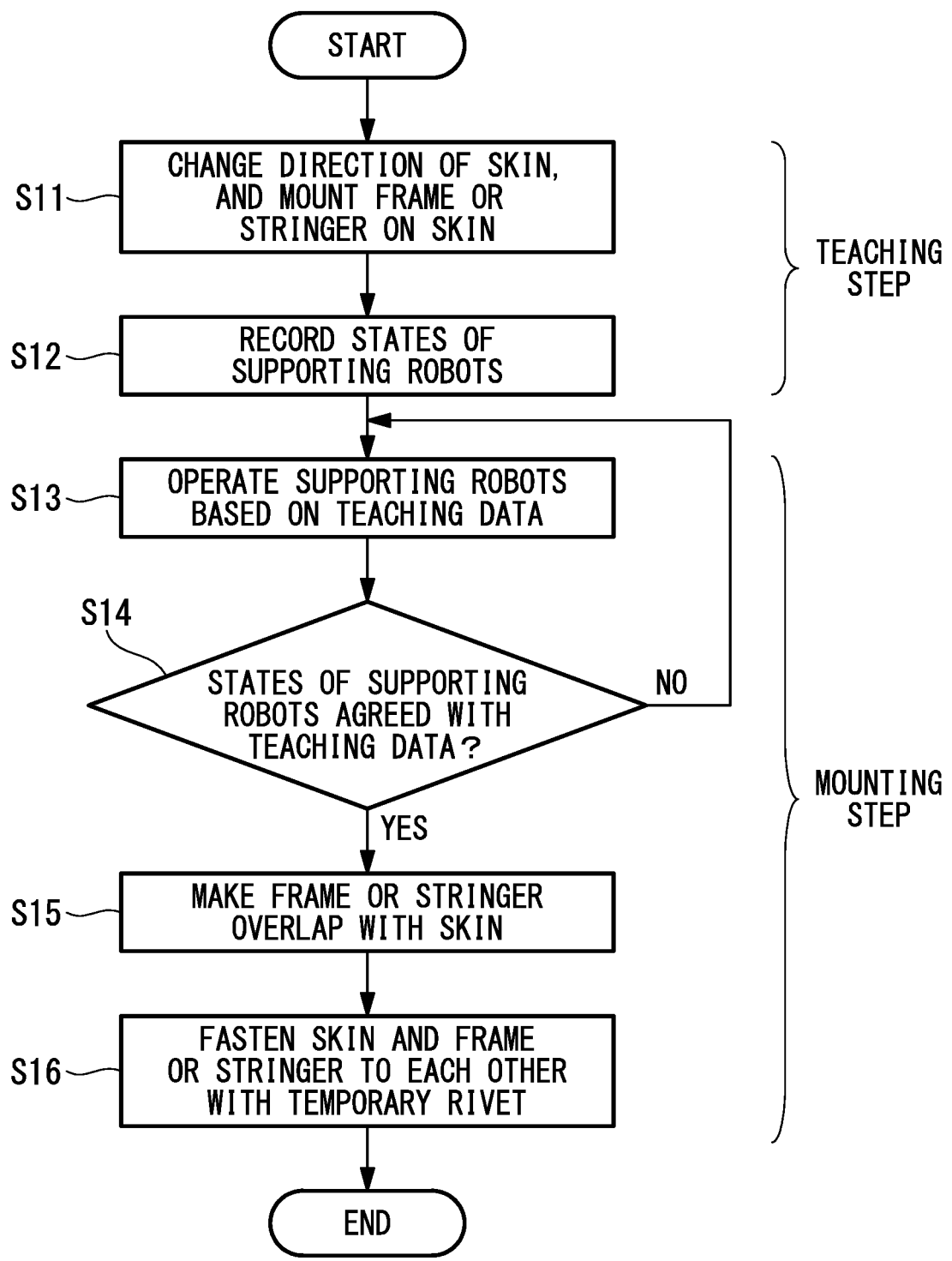
FIG. 3 is a flowchart showing a method for manufacturing an aircraft component using the aircraft component manufacturing system according to the first embodiment of the present invention.

Next, a method for manufacturing an aircraft component using the aircraft component manufacturing system 1 according to this embodiment is described with reference to FIG. 3.

This method includes, first, a teaching step where an operation is taught to the supporting robots 2 when a first product is produced, and a mounting step where the supporting robots 2 are operated based on the teaching data, and the mounting robot 3 mounts the frame 52 or the stringer 53 on the skin 51.

This method includes the teaching step. Accordingly, when members for a second or successive product are assembled after the completion of the teaching step, the direction of the skin 51 is automatically changed by the supporting robots 2 without an operator manipulating the supporting robots 2. Further, the mounting robot 3 can mount the frame 52 or the stringer 53 on the skin 51 directed in a direction advantageous at the time of assembly.

The teaching step is performed while an operator or a person in charge of production technology changes the direction of the skin 51 and checks the deformed state of the skin 51 in performing the task of mounting the frame 52 or the stringer 53 on the skin 51. The skin 51 is a plate-shaped member, and has low rigidity and hence, changing the direction of the skin 51 causes the skin 51 to be deformed under the influence of gravity.

In the mounting task, the direction of the skin 51 is changed and, when the skin 51 assumes a shape and direction advantageous for assembly, the frame 52 or the stringer 53 is mounted on the skin 51 (step S11). At this point of operation, the states of the supporting robots 2, which support the skin 51, in performing the mounting task are recorded in the memory 10 as teaching data (step S12). In this embodiment, the state of the supporting robot 2 refers to the position and the direction of the arm 6 or the hand 7, an operation process and the like.

After the teaching step is completed, when members for a second or successive product are assembled, the mounting step is performed without performing the teaching step.

In the mounting step, the supporting robots 2 which support the skin 51 are operated based on the teaching data (step S13). At this point of operation, it is determined whether or not the states of the supporting robots 2 agree with the teaching data (step S14). When the states of the supporting robots 2 agree with the teaching data, it is determined that the skin 51 supported by the supporting robots 2 is in a shape and direction advantageous for assembly. The supporting robots 2 maintain the state of the skin 51 in a state where the skin 51 is determined to be in a shape and direction advantageous for assembly.

In a state where the skin 51 is determined to be in a shape and direction advantageous for assembly, the mounting robot 3 moves the frame 52 or the stringer 53 to a mounting position based on data relating to the mounting position, thus making the frame 52 or the stringer 53 overlap with the skin 51 (step S15). When it is necessary, the supporting robots 2 are operated so as to make the skin 51 further overlap with the frame 52 or the stringer 53.

Thereafter, a riveting robot (not shown in the drawing) inserts a temporary rivet into a keyhole formed in the skin 51 and a keyhole formed in the frame 52 or the stringer 53, the skin 51 and the frame 52 or the stringer 53 being made to overlap with each other. Then, the skin 51 and the frame 52 or the stringer 53 are fastened to each other with the temporary rivet (step S16).

The skin 51 is a plate-shaped member, and has low rigidity and hence, the skin 51 is deformed under the influence of gravity. Accordingly, when the supporting robots 2 are operated to change the direction of the skin 51, the skin 51 can be deformed into a shape advantageous for assembly. For example, by changing the direction of the skin 51 which has an arc shape in cross section, it is possible to increase or decrease the curvature of the skin 51.

Figure 4:
FIG. 4 is an end view showing the skin, and showing an example where the skin is supported in a horizontal state.
Figure 5:
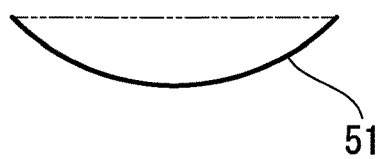
FIG. 5 is an end view showing the skin, and showing an example where the skin is supported in a horizontal state.
Figure 6:
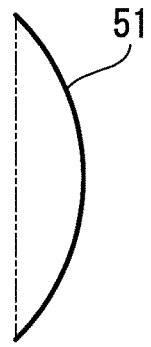
FIG. 6 is an end view showing the skin, and showing an example where the skin is supported in a vertical state.
Figure 7:
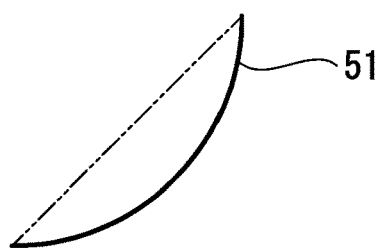
FIG. 7 is an end view showing the skin, and showing an example where the skin is supported in an inclined state with respect to the horizontal direction.

For example, the direction of the skin 51 is changed such that the chord which connects one end portion and the other end portion of the skin 51 assumes a horizontal state (see FIG. 4 and FIG. 5), a vertical state (see FIG. 6), or an inclined state with respect to the horizontal direction (see FIG. 7). A state where the skin 51 is in a horizontal state includes a case where the arc of the skin 51 is disposed above the chord (see FIG. 4), and a case where the arc of the skin 51 is disposed below the chord on the other hand (see FIG. 5). In each state, the skin 51 supported by the supporting robots 2 assumes a different shape due to the influence of gravity.

The shape and direction of a skin advantageous for assembly includes states, such as a state where the frame 52 or the stringer 53 is properly made to overlap with the skin 51 so as to allow proper riveting, or a state where a riveting robot can easily perform riveting with a temporary rivet in a state where the frame 52 or the stringer 53 is made to overlap with the skin 51, for example.

In the above-mentioned embodiment, the description has been made with respect to the case where the skin 51 is maintained at a fixed position during the task of mounting the frame 52 or the stringer 53 on the skin 51. However, the present invention is not limited to such an example. The supporting robots 2 may be operated to change the attitude of the skin 51 while the mounting task is performed.

As has been described above, according to this embodiment, the skin 51 is supported so as to be deformable due to gravity, and the shape and direction of the skin 51 are adjusted so as to be advantageous for assembly in the mounting step. Accordingly, it is possible to improve efficiency of the task when positioning of members, such as the skin 51, the frame 52, or the stringer 53, is performed using the supporting robots 2 and the mounting robot 3, and when riveting is performed on the positioned members with temporary rivets to form these members into an integral body.

Second Embodiment

Figure 8:
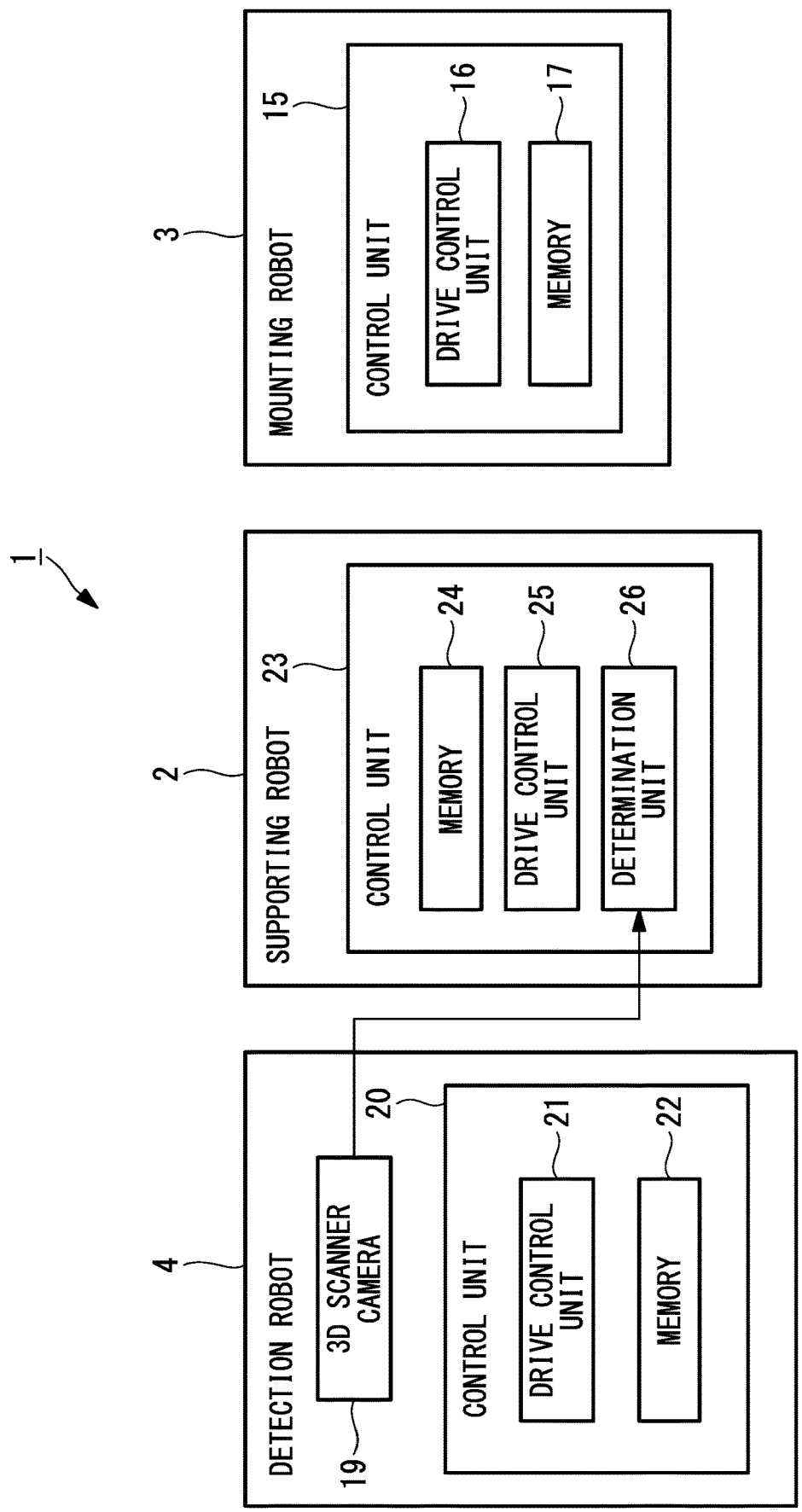
FIG. 8 is a block diagram showing an aircraft component manufacturing system according to a second embodiment of the present invention.

As shown in FIG. 8, an aircraft component manufacturing system 1 according to a second embodiment of the present invention includes two supporting robots 2 which support a skin 51, a mounting robot 3 which mounts a frame 52 or a stringer 53 on the skin 51, a detection robot 4 which detects the shape of the skin 51 and the like. In this embodiment, the supporting robots 2 are operated to change the direction of the skin 51 using data acquired by the detection robot 4.

Figure 9:
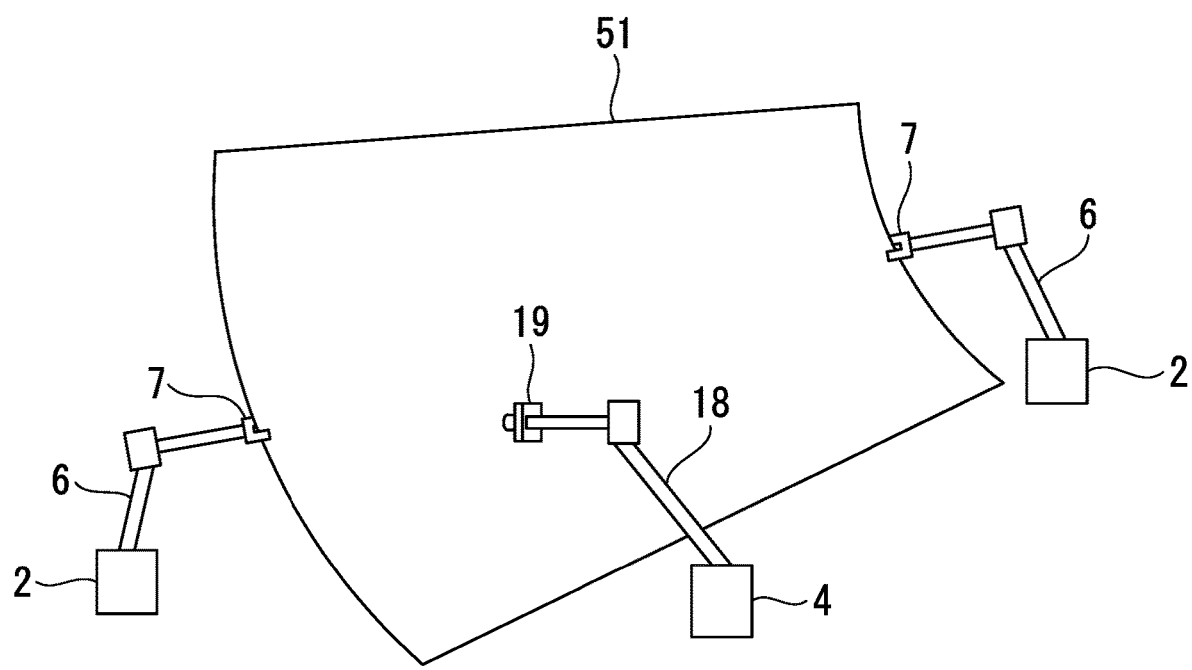
FIG. 9 is a schematic view showing supporting robots, a detection robot, and a skin according to the second embodiment of the present invention.

As shown in FIG. 9, the detection robot 4 includes an arm 18, and a 3D scanner camera 19 is mounted on the distal end of the arm 18. The detection robot 4 is controlled by a control unit 20. The operation of the control unit 20 is achieved by hardware resources, such as a CPU, with execution of a program recorded in advance.

As shown in FIG. 8, the control unit 20 of the detection robot 4 includes a drive control unit 21, a memory 22 and the like.

The drive control unit 21 moves the 3D scanner camera 19, which is mounted on the arm 18, to an area in the vicinity of the skin 51 based on design data relating to the skin 51, and the drive control unit 21 causes the 3D scanner camera 19 to perform scanning in the vicinity of the skin 51.

The 3D scanner camera 19 images the shape of the skin 51. Image data acquired by the 3D scanner camera 19 is transmitted to a control unit 23 of the supporting robot 2.

In the same manner as FIG. 2 showing the first embodiment, each supporting robot 2 includes an arm 6. A gripping unit (hand) 7 is mounted on the distal end of the arm 6, and the gripping unit 7 grips the skin 51. The supporting robot 2 supports the skin 51 by gripping the center portion of an arc-shaped end portion of the skin 51, for example. The supporting robot 2 is controlled by the control unit 23.

As shown in FIG. 8, the control unit 23 of the supporting robot 2 includes a memory 24, a drive control unit 25, a determination unit 26 and the like. The operation of the control unit 23 is achieved by hardware resources, such as a CPU, with execution of a program recorded in advance.

The drive control unit 25 causes the supporting robot 2 to operate in the mounting step.

The determination unit 26 receives image data from the 3D scanner camera 19. The determination unit 26 performs a comparison between shape data acquired by the 3D scanner camera 19 and data relating to the shape and direction of a skin advantageous for assembly which is recorded in advance in the memory 24.

Further, the determination unit 26 determines whether or not the skin 51, which is supported by the supporting robots 2, is in the shape and direction advantageous for assembly based on the result of the comparison between the shape data acquired by the 3D scanner camera 19 and the data relating to the shape and direction of the skin 51 advantageous for assembly which is recorded in advance in the memory 24.

The drive control unit 25 operates the supporting robot 2 such that the result of the comparison made by the determination unit 26 between the shape data acquired by the 3D scanner camera 19 and the data relating to the shape and direction of the skin advantageous for assembly which is recorded in advance in the memory 24 assumes the shape and direction of the skin advantageous for assembly. When the determination unit 26 determines that the state of the supporting robot 2 agrees with data relating to the shape and direction of the skin 51 advantageous for assembly which is recorded in advance in the memory 24, the drive control unit 25 maintains the state of the supporting robot 2.

In the same manner as FIG. 2 showing the first embodiment, the mounting robot 3 includes the arm 13. A gripping unit (hand) 14 is mounted on the distal end of the arm 13, and the gripping unit 14 grips the frame 52 or the stringer 53. The mounting robot 3 is controlled by the control unit 15. The operation of the control unit 15 is achieved by hardware resources, such as a CPU, with execution of a program recorded in advance.

As shown in FIG. 8, the control unit 15 of the mounting robot 3 includes a drive control unit 16, a memory 17 and the like.

Based on data relating to a mounting position which is recorded in advance in the memory 17, the drive control unit 16 drives the arm 13 of the mounting robot 3 to move the frame 52 or the stringer 53 to the mounting position recorded in advance. As a result, the frame 52 or the stringer 53 is made to overlap with the skin 51 by the mounting robot 3.

Figure 10:
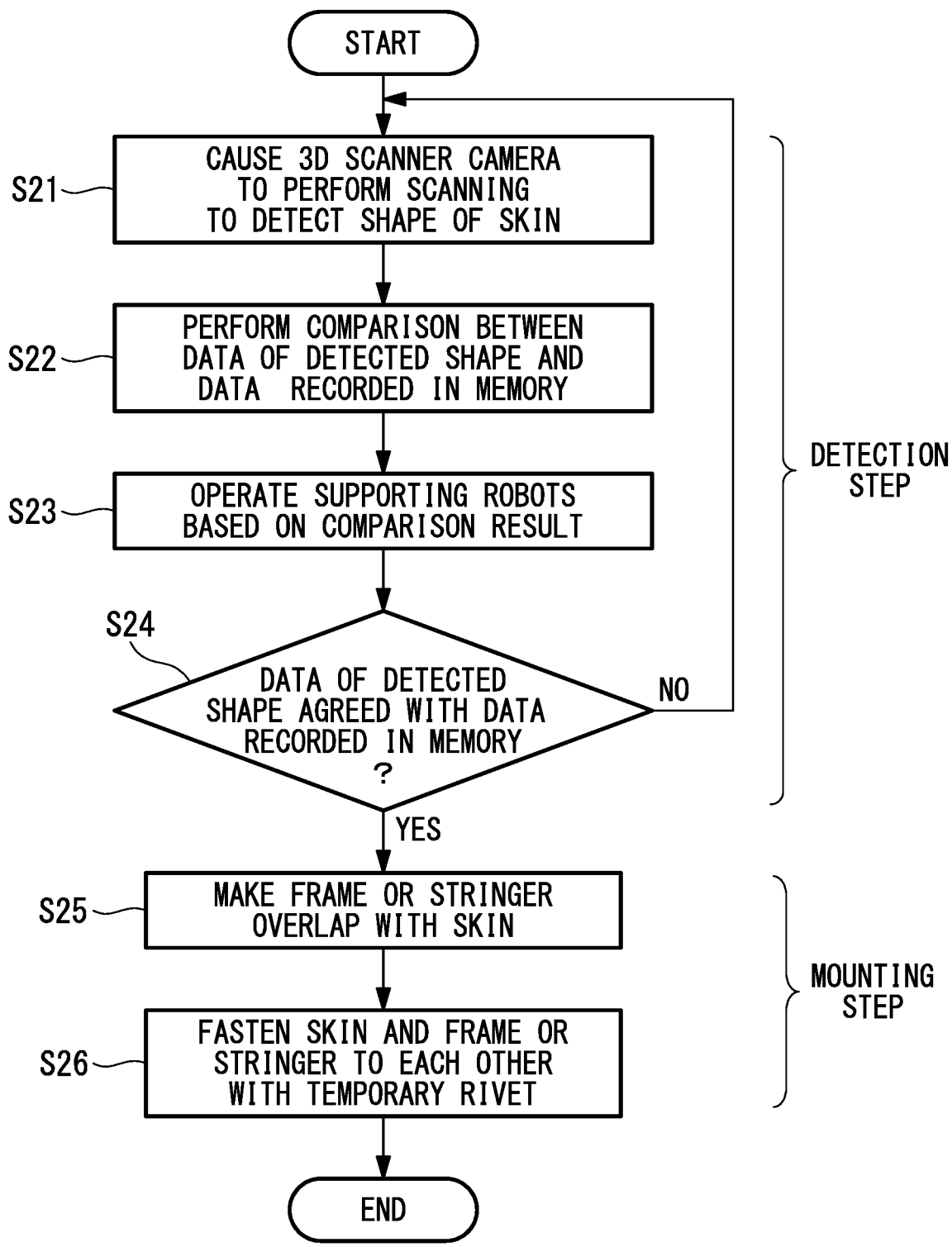
FIG. 10 is a flowchart showing a method for manufacturing an aircraft component using the aircraft component manufacturing system according to the second embodiment of the present invention.

Next, a method for manufacturing an aircraft component using the aircraft component manufacturing system 1 according to this embodiment is described with reference to FIG. 10.

This method includes, first, a step where the detection robot 4 detects the shape of the skin 51 supported by the supporting robots 2, and a mounting step where the supporting robots 2 are operated based on the detected shape of the skin 51, and the mounting robot 3 mounts the frame 52 or the stringer 53 on the skin 51.

With such operations, the shape of the skin 51 is detected each time the operation is performed without an operator manipulating the supporting robots 2, and the direction of the skin 51 is automatically changed corresponding to the deformed state of the skin 51 by the supporting robots 2 such that the skin 51 assumes a shape advantageous for mounting the frame 52 or the stringer 53. The mounting robot 3 can mount the frame 52 or the stringer 53 on the skin 51 directed in a direction advantageous for assembly.

In the detection step, first, the detection robot 4 causes the 3D scanner camera 19, which is mounted on the distal end of the arm 18, to perform scanning to detect the shape of the skin 51 (step S21). Shape data acquired by the 3D scanner camera 19 is transmitted to the control unit 23 of the supporting robot 2.

The control unit 23 of the supporting robot 2 performs a comparison between the shape data acquired by the 3D scanner camera 19 and design data (CAD data) of the skin 51 recorded in advance in the memory 24. With such a comparison, it is possible to determine how the skin 51, which is supported by the supporting robots 2, is deformed compared with the shape of the completed skin 51.

The control unit 23 of the supporting robot 2 further performs a comparison between the shape data acquired by the 3D scanner camera 19 and data relating to the shape and direction of the skin 51 advantageous for assembly which is recorded in advance in the memory 24 (step S22). In performing a comparison, difference data may be used which is obtained by comparing the shape data acquired by the 3D scanner camera 19 and the design data (CAD data) of the skin 51 recorded in advance in the memory 24. That is, a comparison may be performed between the above-mentioned difference data and difference data obtained by performing a comparison between data relating to the shape and direction of the skin 51 advantageous for assembly which is recorded in advance in the memory 24 and design data (CAD data) of the skin 51.

The supporting robots 2 are operated such that the result of the comparison between the shape data acquired by the 3D scanner camera 19 and the data relating to the shape and direction of the skin 51 advantageous for assembly which is recorded in advance in the memory 24 assumes the shape and direction of the skin 51 advantageous for assembly (step S23).

Then, the determination is made on whether or not shape data successively acquired by the 3D scanner camera 19 agrees with data relating to the shape and direction of the skin 51 advantageous for assembly which is recorded in advance in the memory 24 (step S24). When the shape data successively acquired by the 3D scanner camera 19 agrees with the data relating to the shape and direction of the skin 51 advantageous for assembly which is recorded in advance in the memory 24, it can be determined that the skin 51 supported by the supporting robots 2 is in a shape and direction advantageous for assembly. Accordingly, when it is determined that the shape data acquired by the 3D scanner camera 19 agrees with the data relating to the shape and direction of the skin 51 advantageous for assembly which is recorded in advance in the memory 24, the supporting robots 2 maintain such a state.

Next, in a state where the skin 51 is determined to be in the shape and direction advantageous for assembly, the processing advances to the mounting step.

In the mounting step, the mounting robot 3 moves the frame 52 or the stringer 53 to a mounting position based on the data relating to a mounting position, thus making the frame 52 or the stringer 53 overlap with the skin 51. When it is necessary, the supporting robots 2 are operated so as to make the skin 51 further overlap with the frame 52 or the stringer 53 (step S25).

Thereafter, a riveting robot (not shown in the drawing) inserts a temporary rivet into a keyhole formed in the skin 51 and a keyhole formed in the frame 52 or the stringer 53, the skin 51 and the frame 52 or the stringer 53 being made to overlap with each other. Then, the skin 51 and the frame 52 or the stringer 53 are fastened to each other with the temporary rivet (step S26).

The skin 51 is a plate-shaped member, and has low rigidity and hence, the skin 51 is deformed under the influence of gravity. Accordingly, when the supporting robots 2 are operated to change the direction of the skin 51, the skin 51 can be deformed into a shape advantageous for assembly. For example, by changing the direction of the skin 51 which has an arc shape in cross section, it is possible to increase or decrease the curvature of the skin 51.

For example, the direction of the skin 51 is changed such that the chord which connects one end portion and the other end portion of the skin 51 assumes a horizontal state, a vertical state, or an inclined state with respect to the horizontal direction. A state where the skin 51 is in a horizontal state includes a case where the arc of the skin 51 is disposed above the chord, and a case where the arc of the skin 51 is disposed below the chord on the other hand. In each state, the skin 51 supported by the supporting robots 2 assumes a different shape due to the influence of gravity.

The shape and direction of a skin advantageous for assembly includes states, such as a state where the frame 52 or the stringer 53 is properly made to overlap with the skin 51 so as to allow proper riveting, or a state where a riveting robot can easily perform riveting with a temporary rivet in a state where the frame 52 or the stringer 53 is made to overlap with the skin 51, for example.

In the above-mentioned embodiment, the description has been made with respect to the case where the skin 51 is maintained at a fixed position during the task of mounting the frame 52 or the stringer 53 on the skin 51. However, the present invention is not limited to such an example. The supporting robots 2 may be operated to change the attitude of the skin 51 while the mounting task is performed.

As has been described above, according to this embodiment, the skin 51 is supported so as to be deformable due to gravity, and the shape and direction of the skin 51 are adjusted so as to be advantageous for assembly in the mounting step. Accordingly, it is possible to improve efficiency of the task when positioning of members, such as the skin 51, the frame 52, or the stringer 53, is performed using the supporting robots 2 and the mounting robot 3, and when riveting is performed on the positioned members with temporary rivets to form these members into an integral body.

REFERENCE SIGNS LIST 1 aircraft component manufacturing system
2 supporting robot
3 mounting robot
4 detection robot
6 arm
7 hand
8 control unit
9 teaching unit 10 memory
11 drive control unit
12 determination unit
13 arm
15 control unit
16 drive control unit
17 memory
18 arm
19 3D scanner camera
20 control unit
21 drive control unit
22 memory
23 control unit
24 memory
25 drive control unit
26 determination unit
51 skin
52 frame
53 stringer

The invention claimed is:

1. A method for manufacturing a component, the method comprising:
a first step where a supporting robot supports a first member having a plate shape in a state where the first member is deformable due to gravity;
a second step where a support state of the first member is changed based on a deformed shape of the first member, which is recorded in advance in a storage unit and which is obtained at a time of mounting a second member on the first member;
a third step where a mounting robot mounts the second member on the first member where the support state is changed; and
before the second step, a fourth step of recording, in the storage unit, the deformed shape of the first member in a state of being supported, the deformed shape being obtained at the time of mounting the second member on the first member, and recording the support state of the first member which is brought about by the supporting robot, wherein
in the second step, a support state of the first member is changed such that the first member assumes the support state which is recorded in the storage unit, which is obtained at the time of mounting the second member on the first member, and which is brought about by the supporting robot.

2. A method for manufacturing a component, the method comprising:
a first step where a supporting robot supports a first member having a plate shape in a state where the first member is deformable due to gravity;
a second step where a support state of the first member is changed based on a deformed shape of the first member, which is recorded in advance in a storage unit and which is obtained at a time of mounting a second member on the first member; and
a third step where a mounting robot mounts the second member on the first member where the support state is changed, wherein
the second step includes:
a step where a detection robot detects a shape of the first member; and
a step where after a comparison is performed between the shape of the first member which is detected and the deformed shape of the first member, which is recorded in advance in the storage unit and which is obtained at the time of mounting the second member on the first member, a support state of the first member is changed.

3. A component manufacturing system comprising:
a supporting robot configured to support a first member having a plate shape in a state where the first member is deformable due to gravity; and
a mounting robot configured to mount a second member on the first member, wherein
the supporting robot includes a first control unit which drives the supporting robot so as to change a support state of the first member based on a deformed shape of the first member, which is recorded in advance in a storage unit and which is obtained at a time of mounting the second member on the first member,
the mounting robot includes a second control unit which drives the mounting robot so as to mount the second member on the first member where the support state is changed,
the supporting robot further includes the storage unit which records the deformed shape of the first member in a state of being supported, the deformed shape being obtained at the time of mounting the second member on the first member, and a support state of the first member which is brought about by the supporting robot, and
the first control unit of the supporting robot drives the supporting robot to change the support state of the first member such that the first member assumes a support state which is recorded in the storage unit, which is obtained at the time of mounting the second member on the first member, and which is brought about by the supporting robot.

4. A component manufacturing system comprising:
a supporting robot configured to support a first member having a plate shape in a state where the first member is deformable due to gravity;
a mounting robot configured to mount a second member on the first member; and
a detection robot configured to detect a shape of the first member, wherein
the supporting robot includes a first control unit which drives the supporting robot so as to change a support state of the first member based on a deformed shape of the first member, which is recorded in advance in a storage unit and which is obtained at a time of mounting the second member on the first member,
the mounting robot includes a second control unit which drives the mounting robot so as to mount the second member on the first member where the support state is changed, and
the first control unit of the supporting robot performs a comparison between the shape of the first member which is detected and the deformed shape of the first member, which is recorded in advance in the storage unit and which is obtained at the time of mounting the second member on the first member, and the first control unit of the supporting robot drives the supporting robot to change the support state of the first member.

* * * * *